US012083627B1

(12) United States Patent
Cen et al.

(10) Patent No.: US 12,083,627 B1
(45) Date of Patent: Sep. 10, 2024

(54) MULTI-SPOTS SOLDERING METHOD FOR PROCESSING CAMERA AND LASER RADAR

(71) Applicant: ShenZhen Rayshine Automation Technology Co., LTD., Guangdong (CN)

(72) Inventors: Quan Cen, Guangdong (CN); Zengwen Zhang, Guangdong (CN); Xinjian Li, Guangdong (CN)

(73) Assignee: ShenZhen Rayshine Automation Technology Co., LTD., Guangdong (CN)

( * ) Notice: Subject to any disclaimer, the term of this patent is extended or adjusted under 35 U.S.C. 154(b) by 0 days.

(21) Appl. No.: 18/395,693

(22) Filed: Dec. 25, 2023

(30) Foreign Application Priority Data

May 5, 2023 (CN) .......................... 202310495923.8

(51) Int. Cl.
*B23K 1/00* (2006.01)
*B23K 3/08* (2006.01)
*B23K 101/36* (2006.01)

(52) U.S. Cl.
CPC .............. B23K 3/08 (2013.01); B23K 1/0008 (2013.01); *B23K 2101/36* (2018.08)

(58) Field of Classification Search
CPC .............. B23K 1/0016; B23K 2101/36; B23K 9/0956; B23K 9/0953; B23K 26/03; B23K 1/00; B23K 9/095; B23K 3/06; B23K 3/0607; B23K 31/125
See application file for complete search history.

(56) References Cited

U.S. PATENT DOCUMENTS

| 4,218,922 | A | * | 8/1980 | Ensminger | ............. | G01N 27/20 |
| | | | | | | 73/588 |
| 5,522,263 | A | * | 6/1996 | Arita | ...................... | G01N 29/30 |
| | | | | | | 73/602 |
| 9,573,217 | B2 | * | 2/2017 | Burkhart | ............. | B23K 9/1081 |
| 2011/0247202 | A1 | * | 10/2011 | Inoue | .................. | B23K 3/0475 |
| | | | | | | 29/705 |
| 2012/0312789 | A1 | * | 12/2012 | Bavhammar | ........ | B23K 3/0478 |
| | | | | | | 219/85.1 |

* cited by examiner

*Primary Examiner* — Erin B Saad
(74) *Attorney, Agent, or Firm* — Cooper Legal Group, LLC

(57) ABSTRACT

A multi-spots welding method for processing a camera and a laser radar includes a position-determining method of welding spots, a solder-control method and a welding energy compensation method; the position-determining method of welding spots includes providing a plurality of welding spots between a first weldment and a second weldment; the solder-control method includes adding equivalent amount of solder on the plurality of welding spots according to a preset amount of the solder; and the welding energy compensation method includes detecting energy of the plurality of welding spots in real time when the plurality of welding spots are welded simultaneously, comparing detected real-time data of the plurality of welding spots with the preset amount of the solder.

10 Claims, 5 Drawing Sheets

MULTI-SPOTS SOLDERING METHOD FOR PROCESSING CAMERA AND LASER RADAR

CROSS-REFERENCE TO RELATED APPLICATION

This application is based on and claims the priority and benefit of Chinese patent application serial no. 202310495923.8, filed on May 5, 2023. The entirety of Chinese patent application serial no. 202310495923.8 is hereby incorporated by reference herein and made a part of this specification.

TECHNICAL FIELD

The present application relates to the technical field of processing and manufacturing for a camera and a laser radar, and in particular, relates to a multi-spots soldering method for processing a camera and a laser radar.

BACKGROUND

In the production processes of a camera and a laser radar, including soldering procedures of a lens body and a sensor, the soldering quality of the sensor and the lens body plays a vital role in lens module performance. In the related technology, a lens is soldered with the sensor through an asynchronous soldering method of the lens and the sensor, in which the soldering spots are added one by one, or the lens is stuck to the sensor, such as using an optical adhesive. The asynchronous soldering method needs to provide bonding pads and soldering spots in turn, and soldering needs to be performed one by one via soldering tools. The steps are complex and a rotating device below the sensor or the lens is needed. Besides, the asynchronous soldering method has no solders and soldering temperature compensation function, so the parallel relationship between the lens and the sensor cannot be maximized in the finished products, which directly affect the imaging effect. However, the sticking connection may be affected by temperature, humidity or other factors, which causes poor reliability issues such as yellowing, cracking, and even detachment of lenses.

SUMMARY

An objective of the technical solution of the present application is to solve one of the technical problems in the related technology. For this, the main objective of the present application is to provide a multi-spots soldering method for processing a camera and a laser radar, which aims to solve problems that the parallel relationship between lens and sensor or other various planes cannot be maximized, and the reliability is low, in the soldering method of related technical technology.

In order to achieve the above objective, the present application provides a multi-spots soldering method for processing a camera and a laser radar, including
step A1, position-determining method of soldering spots;
step A2, solder-control method;
step A3, soldering energy compensation method;
the position-determining method of soldering spots includes providing a plurality of soldering spots between a first soldering component and a second soldering component, and the plurality of soldering spots are connected successively to form a regular polygon, a relationship of the second soldering component and the first soldering component are corresponding parallel concentric circles, and the plurality of soldering spots are located within a range of the second soldering component;
the solder-control method includes adding equivalent amount of solder on the plurality of soldering spots according to a preset amount of the solder, and the preset amount of the solder are determined by sizes and surface materials of the first soldering component and the second soldering component; and
the soldering energy compensation method includes detecting energy of the plurality of soldering spots in real time when the plurality of soldering spots are soldered simultaneously, comparing detected real-time data of the plurality of soldering spots with the preset amount of the solder; increasing soldering energy to the soldering spots below the preset amount of the solder, when the detected real-time data is less than the preset amount of the solder; and decreasing soldering energy to the soldering spots above the preset amount of the solder, when the detected real-time data is greater than the preset amount of the solder.

In the above technical solution, the soldering spots are provided in a concentric circle of the first soldering component and the second soldering component, the plurality of soldering spots are connected successively to form a regular polygon, such that the soldering spots become firm force points which divide the first soldering component and the second soldering component evenly, and a soldering surface is firm and not easily deformed. Equivalent amount of solder are added at the soldering spots, the energy of the soldering spots are detected and adjusted in real time, so that each of the soldering spots has same soldering quality, and the first soldering component and the second soldering component are kept maximum parallel.

As a further embodiment of the present application, an adding and a soldering of the solder are conducted simultaneously, and the adding of the solder are adjusted timely as desired, to ensure a soldering quality.

As a further embodiment of the present application, in the soldering energy compensation method, the energy of the soldering spots are detected in real time via a thermal imaging camera to obtain real-time data.

In the above technical solution, the thermal imaging camera can quickly and accurately capture the heat distribution of each soldering spot, thereby obtaining the real-time data for providing a basis for energy compensation.

As a further embodiment of the present application, the first soldering component is a sensor, and the second soldering component is a lens.

As a further embodiment of the present application, the position-determining method of soldering spots, the solder-control method and the soldering energy compensation method are further capable for soldering of a three-dimensional structure.

In the above technical solution, the multi-spots soldering method is not only capable for the soldering between planes, but also capable for the three-dimensional structures, thereby further extending its application.

As a further embodiment of the present application, when the first soldering component has a same size with the second soldering component, the soldering spots are located at intersections of edges of the first soldering component and second soldering component on the same axis.

As a further embodiment of the present application, the multi-spots soldering method further includes an accuracy detection step for the first soldering component and second soldering component after finishing the soldering.

As a further embodiment of the present application, the accuracy detection step includes detecting a distance between the first soldering component and second soldering component via a laser range finder, and detecting an angle between the first soldering component and second soldering component via an angle sensor.

In the above technical solution, the laser range finder can quickly and accurately detect the distance between the first soldering component and second soldering component, and the angle sensor can detect the angle between the first soldering component and second soldering component. These detected data can used for evaluating the quality and reliability of the soldering, so as to ensure the soldered products to meet the preset accuracy requirements.

As a further embodiment of the present application, the multi-spots soldering method also includes a step of monitoring and recording a soldering process.

In the above technical solution, a step of monitoring and recording is added, which can monitor and record the whole soldering process in real time, thereby facilitating subsequent quality assessment and defect tracing.

As a further embodiment of the present application, a setting of the preset amount of the solder further includes setting of a composition and a proportion of a solder.

In the above technical solution, adjusting composition and proportion of the solder is capable for different soldering requirements, thereby improving the soldering quality and efficiency.

The present application has the following beneficial effects:

the multi-spots soldering method for processing a camera and a laser radar is disclosed in the present application, in which the lens and the sensor are soldered and fixed simultaneously through soldering multi-spots simultaneously, so that the lens and the sensor are parallel and within a depth of field range. The reliability is improved and a long service life is achieved. The multi-spots soldering method includes the solder-control method and the soldering energy compensation method, so that the soldering process is controllable and is capable for soldering of different materials, and the accuracy is improved.

BRIEF DESCRIPTION OF THE DRAWINGS

In order to illustrate the embodiments of the technical solutions of the present application or the technical solutions in the related technology more clearly, the accompanying drawings used in the embodiments or the related technology are briefly described below.

Obviously, the described accompanying drawings below are only some embodiments of the technical solutions of the present application. Some modifications can be obtained by ordinary skilled in the art in accordance with these accompanying drawings without a creative work.

Figure 1:
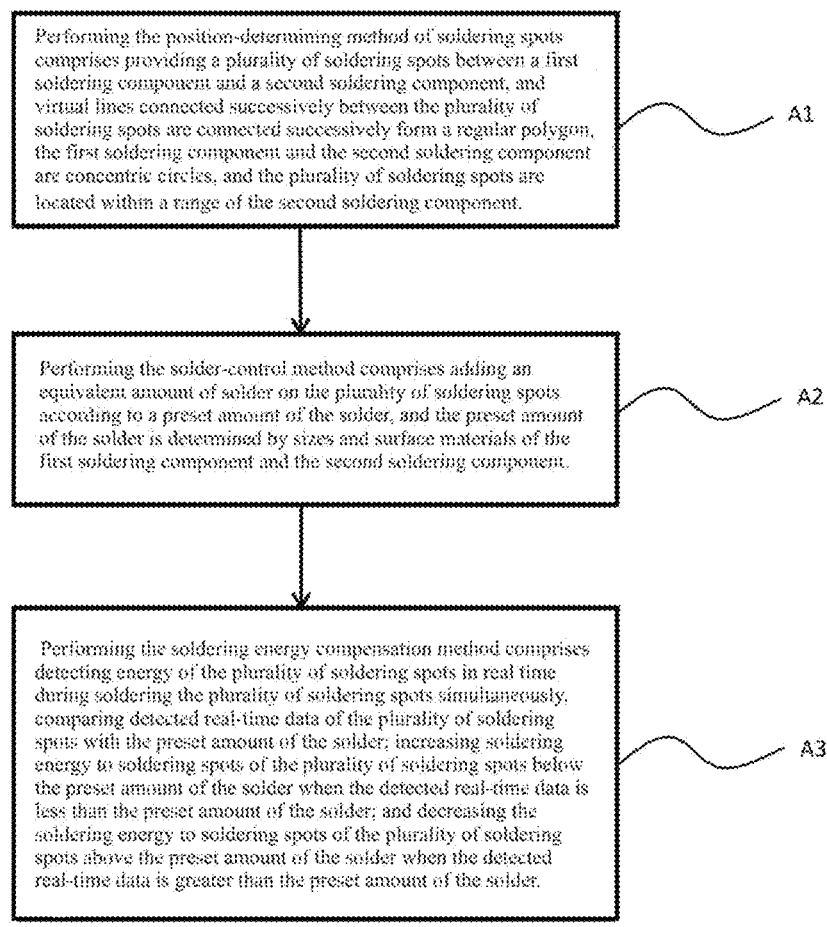
FIG. 1 is a flow diagram for implementing a soldering step according to the present application.

REFERENCE SIGNS OF MAIN
COMPONENTS/ASSEMBLIES

| Reference sign | Name |
| --- | --- |
| 1 | First soldering component |
| 2 | Second soldering component |
| 3 | Soldering spot |

DETAILED DESCRIPTION

In order to illustrate the objectives and advantages of the technical solutions of the present application, the technical solutions in the embodiments of the present application will be further described more clearly and completely below in combination with the accompanying drawings of the embodiments of the present application. Obviously, the described embodiments are only a part of the embodiments of the present application, not all embodiments.

Based on the embodiments of the present application, all other embodiments obtained by ordinary skilled in the art without a creative work fall within the protection scope of the present application.

It needs to be explained that, all directional indications (such as up, down, left, right, front and rear . . . ) in the technical solutions of the present application are only used for explaining relative positional relationships and moving situations of the components in a certain state (as sown in the accompanying drawings), and if a particular state is changed, the directional indications are changed.

The description such as "first", "second" and the like in the technical solutions of the present application are only used for describing, which cannot be understood as indicating or implying its relative importance or implicitly indicating the number of indicated technical features. Therefore, the features with "first" or "second" can indicate or implicitly include at least one of these features.

In the description of the technical solutions of the present application, "multiple" means at least two, such as two, three, etc., unless otherwise specified.

In the technical solutions of the present application, unless otherwise specified, the term "connect", "fix", etc. should be understood as general understanding, for example, "fix" may be fixedly connection, detachably connection or integrally formed; mechanical connection or electrical connection; directly connection or indirectly connection through intermediate mediums; or internal connection between two components or the interaction relationship between two components, unless otherwise specified. The ordinary skilled in the art can understand the specific meanings of the above terms in the technical solutions of the present application according to specific situation.

In addition, the technical solutions of the embodiments of the present application can be combined with each other, provided that it may be obtained by ordinary skilled in the art. When the combined technical solutions are contradictory or not achievable, it should be considered that this combination of the technical solutions does not exist and is not within the protection scope of the technical solution of the present application.

Figure 2:
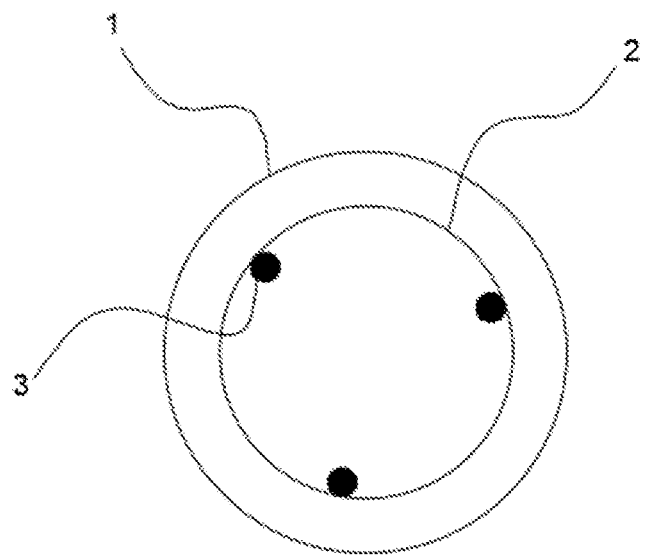
FIG. 2 is a schematic diagram illustrating arranging of a first soldering component, a second soldering component and soldering spots according to the present application.
Figure 3:
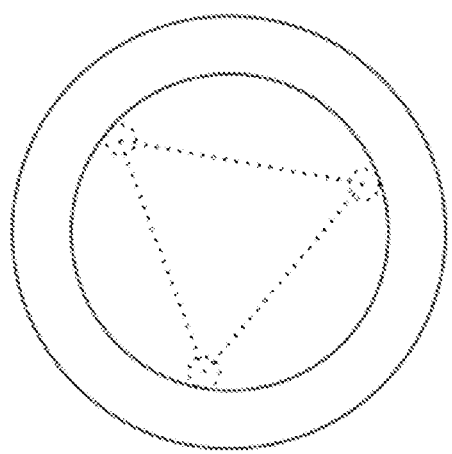
FIG. 3 is a schematic diagram of the connecting lines of the soldering spots according to the present application.
Figure 4:
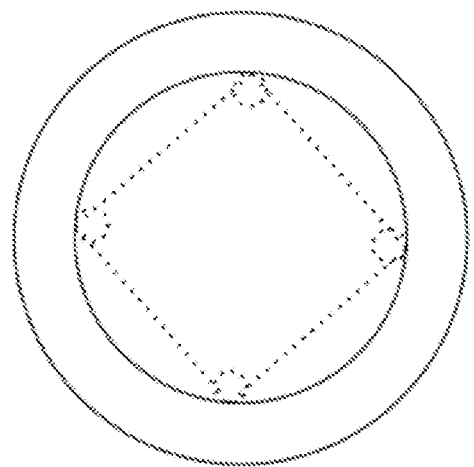
FIG. 4 is a schematic diagram of another distribution and the connecting lines (four soldering spots, quadrilateral) of multiple soldering spots according to the present application.
Figure 5:
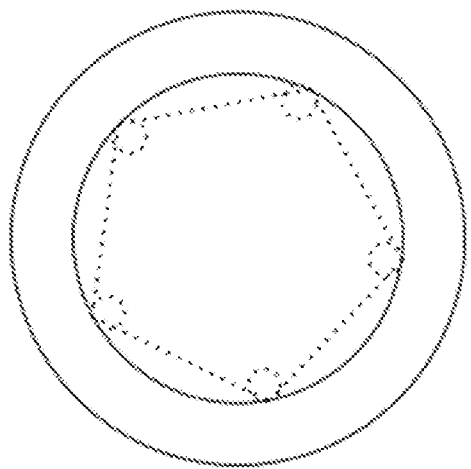
FIG. 5 is a schematic diagram of another distribution and the connecting lines (five soldering spots, pentagon) of multiple soldering spots according to the present application.
Figure 6:
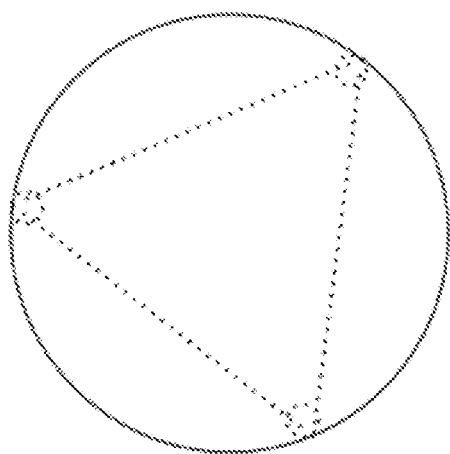
FIG. 6 is a schematic diagram of distribution of soldering spots when a first soldering component and a second soldering component are overlapped according to the present application.
Figure 7:
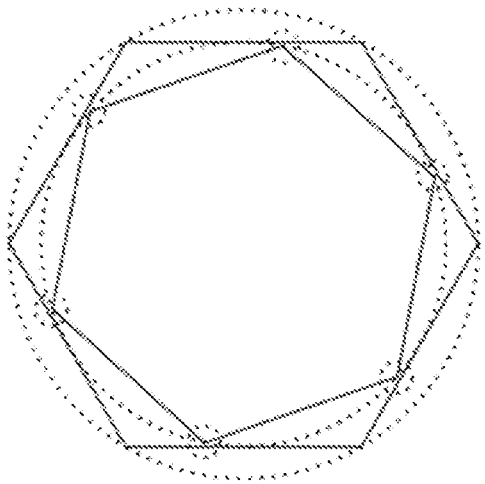
FIG. 7 is a schematic diagram of distribution of soldering spots with other shapes according to the present application.
Figure 8:
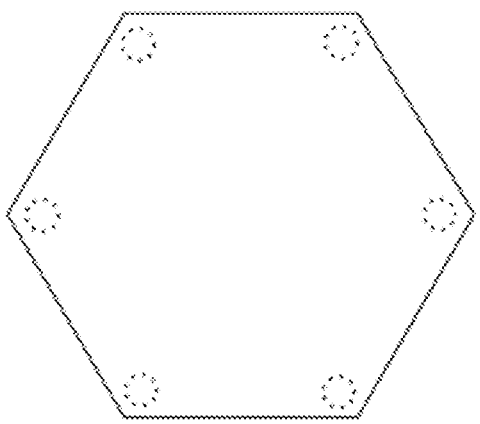
FIG. 8 is a schematic diagram of distribution of soldering spots with other shapes when the soldering components are overlapped according to the present application.

The specific embodiments of the present application are as flows:

Referring to FIGS. 1-8, the implementation steps are as follows: step A1, position-determining method of soldering spots 3; step A2, solder-control method; and step A3, soldering energy compensation method;

the position-determining method of soldering spots 3 includes that, three or more of soldering spots 3 are provided between a first soldering component 1 and a second soldering component 2, and the soldering spots 3 are connected successively to form a regular polygon, a relationship of the second soldering component 2 and the first soldering component 1 are corresponding parallel concentric circles, and the soldering spots 3 are located within a range of the second soldering component 2;

the solder-control method includes that, before the three soldering spots are soldered, each of the soldering spots is added with equivalent amount of solder according to a preset amount of the solder, and the preset amount of the solder are determined by sizes and surface materials of the first soldering component 1 and the second soldering component 2. When the surface materials of the first soldering component 1 and the second soldering component 2 are metal materials or other materials that can be directly soldered, the preset amount of the solder can be set to be 0.

The soldering energy compensation method includes that, when the soldering spots 3 are soldered simultaneously, energy of the soldering spots 3 are detected in real time, the detected real-time data of the plurality of soldering spots are compared with the preset amount of the solder; when the real-time data is less than the preset amount of the solder, the soldering energy is increased to the soldering spots 3 below the preset amount of the solder; and when the real-time data is greater than the preset amount of the solder, the soldering energy is decreased to the soldering spots 3 above the preset amount of the solder.

An implementation principle is as follows:

the concentric circles are cooperated with the soldering spots 3 of the regular polygon, which represents a firm force point divided by the two structures (two planes, lens and sensor, etc.) evenly. On this basis, adding energy soldering is further performed, so that the two planes are kept maximum parallel, and the soldering surface is firm and not easily deformed. The lens is parallel with the sensor, and is kept within a depth of field range, thereby improving the imaging quality and reliability, and having a long service life. In addition, the multi-spots soldering method further has the solder-control method and the soldering energy compensation method, which can control the soldering process within a controllable range, improve the accuracy and is capable for soldering of various materials.

An objective of finding "concentric circles" soldering method is finding an optimal balance force point of the soldering spots, for example, when two soldering components are both polygon, the positions of the soldering spots is arranged to correspond to the inscribed or externally tangent concentric circles of the two weldments.

In a preferable embodiment of the present application, an adding and a soldering of the solder are conducted simultaneously, and a and the adding of the solder are adjusted timely as desired, to ensure a soldering quality.

In a preferable embodiment of the present application, in the soldering energy compensation method, the energy of the soldering spots 3 are detected in real time via a thermal imaging camera to obtain real-time data of the energy of the soldering spots 3. The thermal imaging camera has a sensor that can detect extremely small temperature differences and convert the temperature differences into real-time video, images, or numerical values to display. Therefore, the real-time data of energy of the soldering spots are not limit to the forms such as video, images, or numerical values. The real-time data provides a basis for energy compensation.

In a preferable embodiment of the present application, the first soldering component is a sensor, and the second soldering component is a lens.

In a preferable embodiment of the present application, the position-determining method, the solder-control method and the soldering energy compensation method of the soldering spots 3 are also capable for soldering of a three-dimensional structure. When the three-dimensional structure is soldered, and it is ensured that projections of the soldering spots 3 and the two soldering components are concentric circles, as with when they are in a plane, the above soldering methods can be used for soldering, thereby enlarging its application. Since the adding and the soldering of the solder are conducted simultaneously, the solder is consumed immediately after being added, therefore, when the three-dimensional structure is soldered, the soldering quality would not be affected due to dropping or position deviation of the solder.

In a preferable embodiment of the present application, when the first soldering component has a same size with the second soldering component, the soldering spots are located at intersections of edges of the first soldering component and second soldering component on a same axis.

In a preferable embodiment of the present application, the multi-spots soldering method also includes an accuracy detection step for the first soldering component and second soldering component after finishing the soldering. The accuracy detection step includes detecting a distance between the first soldering component and second soldering component via a laser range finder, and detecting an angle between the first soldering component and second soldering component via an angle sensor. The detected data can be used for evaluating the quality and reliability of the soldering, so as to ensure the soldered products to meet the preset accuracy requirements.

In a preferable embodiment of the present application, the multi-spots soldering method further includes a step of monitoring and recording a soldering process, which can monitor and record the soldering process in real time, thereby facilitating subsequent quality assessment and defect tracing.

In a preferable embodiment of the present application, a setting of the preset amount of the solder further includes setting of a composition and a proportion of a solder. Adjusting composition and proportion of the solder is capable for different soldering requirements, thereby improving the soldering quality and efficiency.

The above are only preferable embodiments of the technical solution of the present application, and do not intend to limit the protection scope of the technical solution of the present application. Any equivalent structural changes made based on the concept of the technical solution of the present application, utilizing the description and accompanying drawings of the technical solution of the present application, or direct/indirect applications in other related technical fields, fall within the protection scope of the technical solution of the present application.

What is claimed is:

1. A multi-spots soldering method, which is applied to a camera or a laser radar, comprising the following steps:
   step A1, determining soldering spots to be soldered on the camera or the laser radar;
   step A2, performing a solder-control method; and
   step A3, performing a soldering energy compensation method;
   wherein the determining soldering spots to be soldered comprises providing a plurality of soldering spots between a first soldering component and a second soldering component, virtual lines connected successively between the plurality of soldering spots form a regular polygon, the first soldering component and the second soldering component are concentric to each other, and the plurality of soldering spots are located within a range of the second soldering component;
   performing the solder-control method comprises adding an equivalent amount of solder on the plurality of soldering spots according to a preset amount of the solder, and the preset amount of the solder is determined by sizes and surface materials of the first soldering component and the second soldering component; and
   performing the soldering energy compensation method comprises detecting energy of the plurality of soldering spots in real time during soldering the plurality of soldering spots simultaneously, comparing detected real-time data of the plurality of soldering spots with the preset amount of the solder; increasing soldering energy to soldering spots of the plurality of soldering spots below the preset amount of the solder when the detected real-time data is less than the preset amount of the solder; and decreasing the soldering energy to soldering spots of the plurality of soldering spots above the preset amount of the solder when the detected real-time data is greater than the preset amount of the solder.

2. The multi-spots soldering method according to claim 1, wherein the adding of the solder and the soldering are conducted simultaneously, and the adding of the solder is adjusted to ensure a soldering quality.

3. The multi-spots soldering method according to claim 1, wherein in the soldering energy compensation method, the soldering energy of the plurality of soldering spots are detected in real time via a thermal imaging camera to obtain the detected real-time data.

4. The multi-spots soldering method according to claim 1, wherein the first soldering component is a sensor of the camera or the laser radar, and the second soldering component is a lens of the camera or the laser radar.

5. The multi-spots soldering method according to claim 1, wherein the determining soldering spots to be soldered, the solder-control method and the soldering energy compensation method are configured for soldering of a three-dimensional structure.

6. The multi-spots soldering method-according to claim 1, wherein when the first soldering component has a same size with the second soldering component, the plurality of soldering spots are located at intersections of edges of the first soldering component and second soldering component on a same axis.

7. The multi-spots soldering method according to claim 1, comprising performing an accuracy detection step for the first soldering component and second soldering component after finishing the soldering energy compensation method.

8. The multi-spots soldering method according to claim 7, wherein performing the accuracy detection step comprises detecting a distance between the first soldering component and second soldering component via a laser range finder, and detecting an angle between the first soldering component and second soldering component via an angle sensor.

9. The multi-spots soldering method according to claim 1, comprising performing a monitoring and recording of the soldering process.

10. The multi-spots soldering method according to claim 1, comprising a setting of the preset amount of the solder by setting of a composition and a proportion of the solder.

* * * * *